United States Patent [19]

Naka et al.

[11] Patent Number: 5,043,926

[45] Date of Patent: Aug. 27, 1991

[54] DATA DRIVE TYPE AIR CONDITIONER CONTROL APPARATUS

[75] Inventors: Shinji Naka, Moriyama; Morihiro Nakayama, Kusatsu; Hiroyuki Unida; Toshiakai Yagi, both of Kusatsu, all of Japan

[73] Assignee: Matsushita Electric Industrial Co., Ltd., Osaka, Japan

[21] Appl. No.: 622,168

[22] Filed: Dec. 3, 1990

Related U.S. Application Data

[63] Continuation of Ser. No. 166,304, Mar. 10, 1988, abandoned.

[30] Foreign Application Priority Data

Mar. 10, 1988 [JP] Japan .................................. 62-54545
Mar. 10, 1988 [JP] Japan .................................. 62-54546

[51] Int. Cl.⁵ ...................... G06F 15/20; G06F 13/00; G06F 9/00
[52] U.S. Cl. .................................... 364/550; 364/505; 364/900; 364/929.2; 364/138; 62/138; 165/12
[58] Field of Search .................... 364/550, 551.01, 505, 364/557, 570, 138, 188, 200, 900; 237/2 A, 2 R; 165/12, 14, 16, 22; 62/132, 158, 159; 236/1 C, 9 A, 49, 51, DIG. 8

[56] References Cited

U.S. PATENT DOCUMENTS

| | | | |
|---|---|---|---|
| 4,276,925 | 7/1981 | Palmieri | 364/505 X |
| 4,373,662 | 2/1983 | Bassett et al. | 364/505 X |
| 4,396,976 | 8/1983 | Hyatt | 364/131 X |
| 4,411,385 | 10/1983 | Lamkewitz | 237/2 A |
| 4,487,363 | 12/1984 | Parker et al. | 236/49 |
| 4,527,247 | 7/1985 | Kaiser et al. | 364/550 |
| 4,543,796 | 10/1985 | Han et al. | 62/160 |
| 4,553,090 | 11/1985 | Hatano et al. | 364/550 X |
| 4,573,115 | 2/1986 | Halgrimson | 364/138 |
| 4,605,160 | 8/1986 | Day | 165/16 X |
| 4,657,179 | 4/1987 | Aggers et al. | 165/12 X |
| 4,661,914 | 4/1987 | Mulokey et al. | 364/557 X |
| 4,686,622 | 8/1987 | Hyatt | 364/200 |
| 4,742,475 | 5/1988 | Kaiser et al. | 165/22 X |
| 4,757,944 | 7/1988 | Kagohata et al. | 236/9 D X |
| 4,829,419 | 5/1989 | Hyatt | 364/188 |

FOREIGN PATENT DOCUMENTS

| | | |
|---|---|---|
| 0191481A2 | 2/1985 | European Pat. Off. . |
| 0155403A2 | 9/1985 | European Pat. Off. . |
| 0220464A2 | 5/1987 | European Pat. Off. . |
| 2153554A | 8/1985 | United Kingdom . |
| 2174261A | 10/1986 | United Kingdom . |
| 2174827A | 11/1986 | United Kingdom . |

Primary Examiner—Joseph L. Dixon
Attorney, Agent, or Firm—Wenderoth, Lind & Ponack

[57] ABSTRACT

A data drive type air conditioner control apparatus includes a main controller for controlling an air conditioner having a plurality of control modes and including an operation procedure memory for storing control operation procedures corresponding to the respective control modes of the air conditioner, and a control data memory for storing numerical data to be used for the control of the air conditioner and including a numerical data memory for initially storing numerical data to be used for controlling the drive of the air conditioner, such that the main controller drives the air conditioner in accordance with the numerical data stored in the control data memory.

17 Claims, 7 Drawing Sheets

DATA DRIVE TYPE AIR CONDITIONER CONTROL APPARATUS

This application is a continuation of now abandoned application, Ser. No. 07/166,304 filed on Mar. 10, 1988.

BACKGROUND OF THE INVENTION

1. Field of the Invention

The present invention relates to an air conditioner control apparatus whose operation is controlled by a microcomputer.

2. Description of the Prior Art

Conventionally, a memory provided in a control means of an air conditioner employing a microcomputer incorporates numerical control data such as a control frequency control data of a compressor of an air conditioner which uses an inverter. In such a system, it is necessary to change the control means because the numerical data must be changed according to different situations. Air conditioners include a wall-mounting type and a floor-mounted type. In addition, air-conditioning capacity differs from unit to unit. Furthermore, resonant frequencies of refrigerant pipes equipped with air conditioners are different with respect to the frequencies of data inputted thereto.

According to such a conventional technique, it is difficult to shorten the lead time required for manufacturing a control apparatus employed in an air conditioner. It is not efficient to incorporate a controlling microcomputer and a ROM for storing a control program and data separately in the air conditioner.

Thus, in order to modify the control program and data incorporated in the memory of the control means, many parts are required to be employed in the air conditioner or expensive parts such as evaluation chips must be employed in the control means of the air conditioner so that the space housing them is small. Furthermore, a troublesome operation is required for creating a ROM because the creation of the ROM requires the inputting of a program thereto. Therefore, it is impossible to shorten the lead time for the mass-production of control apparatus for use in air conditioners.

Thus, it is difficult for the conventional technique to produce many types of control apparatus for air conditioners used in small quantities.

SUMMARY OF THE INVENTION

The present invention has been developed with a view to substantially solving the above-described disadvantages and has for its essential object to obtain a preferable control characteristic by separately providing a main control means for controlling an air conditioner and a control data storing means for accomplishing numerical data controlled by the main control means by changing the numerical data stored by the control data storing means even though the control specification must be changed.

It is another object of the present invention to facilitate the change of control specifications using the control data storing means which is actuated independently from that of the main control means.

It is still another object of the present invention to facilitate the change of numerical data by connecting a control data storing means pertinent to an air conditioner is use selected from a control data storing means having different numerical data.

It is a further object of the present invention to allow the main control means to improve the data processing speed necessary for controlling an air conditioner by moving all the numerical data stored by the control data storing means to the main control means.

In accomplishing the above-described objects, according to the present invention, there is provided a data drive type air conditioner control apparatus comprising a main control means for controlling an air conditioner having a plurality of control modes; a control data storing means for storing numerical data to be used for the control of the air conditioner, said main control means comprising at least a read-out control means for controlling the read-out operation of said control data storing means; a control side serial communication means for effecting a data communication with said control data storing means; a communication result storing means for storing the result of the serial communication and an operation procedure storing means for storing the control operation procedure corresponding to said control mode of said respective means; said control data storing means comprising a data side serial means for controlling the operation of said control data storing means in response to a control signal form said read-out control means, a data side serial communication means for effecting a data communication with the control side serial communication means of said main control means and a numerical data storing means for previously storing numerical data to be used for controlling the drive of the air conditioner, whereby said main control means drives the air conditioner in accordance with the numerical data stored in said control data storing means. In a preferred embodiment of the present invention, there is also provided a data drive type air conditioner control apparatus comprising a main control means for controlling an air conditioner having a plurality of control modes; a drive means for driving equipment mounted on the air conditioner; a control data storing means for storing numerical data to be used for controlling said drive means; said main control means, said drive means, and said control data storing means respectively comprising independent circuits; said main control means comprising at least a read-out control means for controlling the read-out operation of said control data storing means, a control side serial communication means for effecting a data communication with said control data storing means, a communication result storing means for storing the result of the serial communication and an operation procedure storing means for storing the control operation procedures corresponding to said control mode of said respective means and a device control means for controlling the operation of said drive means; said control data storing means comprising: a serial ROM; a data side serial means for controlling the operation of said control data storing means in response to a control signal from said read-out control means; a data side serial communication means for effecting a data communication with the control side serial communication means of said main control means and a numerical data storing means for previously storing numerical data to be used for driving equipment mounted on the air conditioner, said read-out control means being connected to said data side control means through a signal line and said control side serial communication means being connected to said data side control means through a signal line, said data side control means being operated by the read-out operation of said read-out control means and all the numerical data stored by said data storing means being output by the operation of said data side control means and the output numerical data being stored by said communication result storing means of said main control means through said serial communication means and the drive means being operated by said main control means according to the numerical data stored by said communication result storing means, whereby the air conditioner is driven.

BRIEF DESCRIPTION OF THE DRAWINGS

These and other objects and features of the present invention will become apparent from the following description taken in conjunction with preferred embodiment thereof with reference to the accompanying drawings, throughout which like parts are designated by like reference numerals, and in which.

DESCRIPTION OF THE PREFERRED EMBODIMENTS

An embodiment of the present invention is described hereinafter with reference to the drawings.

Figure 1:
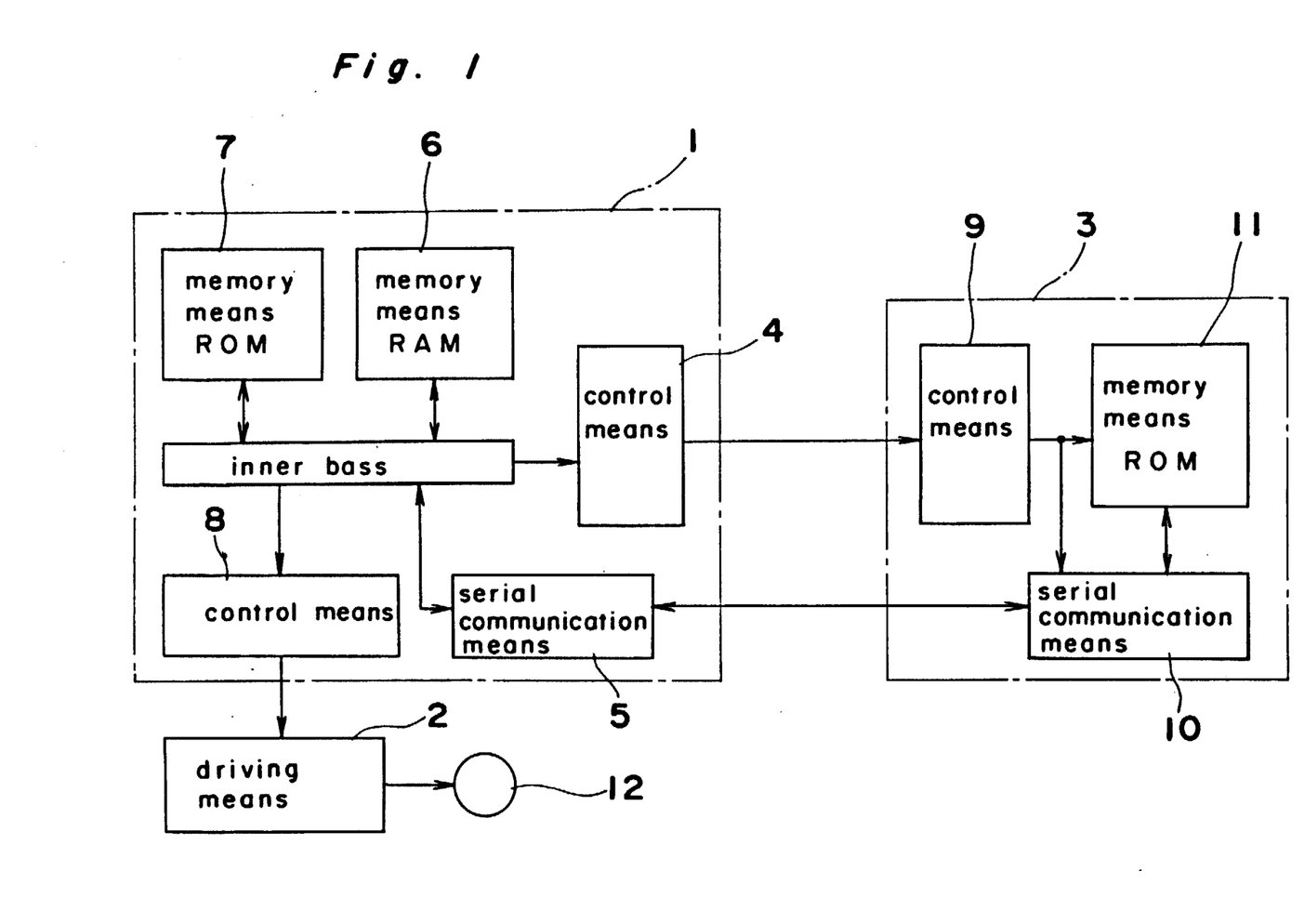
FIG. 1 is a block diagram of an air conditioner control apparatus in accordance with the present invention.

Referring to FIG. 1, the construction of the control apparatus employed in a microcomputer in accordance with the present invention is described.

The apparatus comprises a main control means 1 having a plurality of control modes for controlling an air conditioner, a control data storing means 3 for storing numerical values to be used for controlling the air conditioner, and a drive means 2 for driving equipment, for example, a fan motor 12 contained within the air conditioner. The main control means 1 comprises an operation procedure ROM memory means 7 for not only storing many control modes (for example, an inverter waveform control mode of an inverter driven type compressor, a fan control mode for controlling an indoor fan, an overcurrent flow prevention mode of a compressor, a defrost control mode, and the like), but also the operation procedure for operating the air conditioner control apparatus, a read-out control means 4 actuated by the instruction of the operation procedure memory means 7, a control side serial communication means 5 for effecting a data communication with the control data storing means 3, a communication result RAM memory means 6 for storing the communication result obtained by the control side serial communication means 5, and a drive control means 8 for controlling the operation of the drive means 2 in accordance with the data stored by the communication result memory means 6 and the operation procedure memory means 7.

The control data storing means 3 comprises a numerical data ROM memory means 11 for storing the numerical data (for example, a drive frequency value of a compressor motor, various kinds of preset values such as a voltage to be applied to a fan motor) to be used in controlling equipment contained within the air conditioner, a data side control means 9 for setting up the transmission of the numerical data, stored by the numerical data memory means 11 in response to a control signal transferred from the read-out control means 4, to the main control means 1, and a data side serial communication means 10 paired with the control side serial communication means 5 and transmitting the numerical data, stored by the numerical data memory means 11 and being set up by the data side control means 9, to the main control means side 1.

Figure 8:
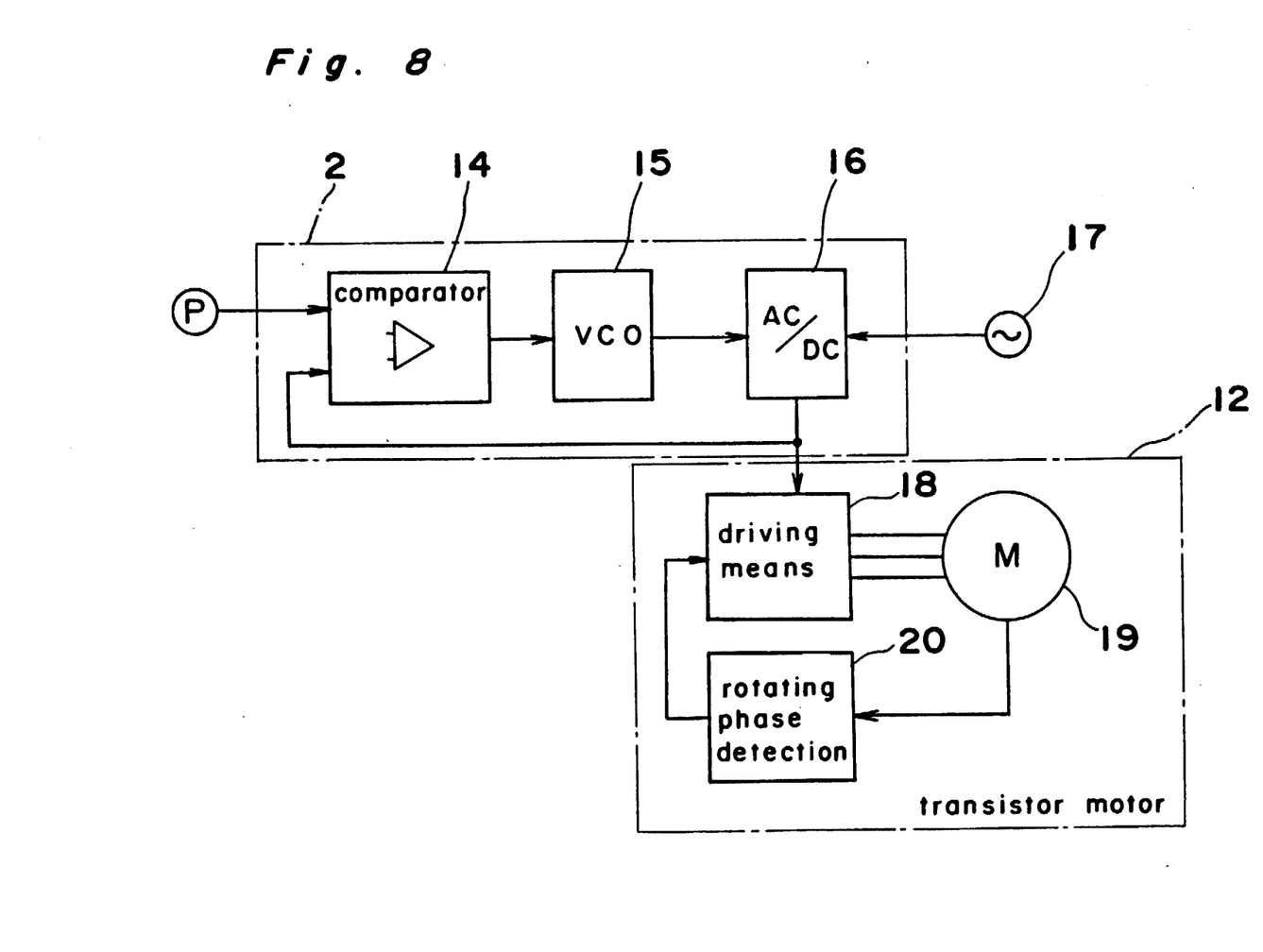
FIG. 8 is a block diagram showing the construction of the system for drive means of the fan motor.

The construction of the drive means 2 is as shown in FIG. 8. The load to be driven by the drive means 2 is described by way of a motor 12 (transistor motor) for driving a fan contained within the air conditioner. The drive means 2 comprises a voltage comparison circuit 14 for comparing the voltage at a point P with the voltage to be supplied to a fan motor 12, a VCO circuit 15 for changing its oscillation frequency in response to the voltage supplied from the voltage comparison circuit 14, and a converter circuit 16 for performing an AC/DC conversion so as to supply a DC voltage to a fan motor 12 according to the frequency of the VCO 15. The fan motor 12 comprises a motor 19 having a sensor (not shown) for detecting the rotation phase angle of a rotor a drive circuit 18 for driving the motor 19, and a rotation phase detection circuit 20 for detecting the rotation phase angle outputted from the sensor employed in the motor 19 and for feeding the output from the sensor of the DC motor 19 back to the drive circuit 18. The fan motor 12 performs a self-control so that it rotates at a speed in accordance with the voltage supplied from the converter circuit 16. The output voltage of the converter circuit 16 is supplied to the voltage comparison circuit 14, whereby the output voltage of the converter circuit 16 is prevented from fluctuating if the AC power supply 17 fluctuates. The drive means 2 controls the voltage to be applied to the fan motor 12 so that the fan motor 12 is driven at a speed in accordance with the DC voltage obtained at a point P.

The operation of the apparatus of the above-described apparatus is described hereinafter with reference to FIG. 1.

First, a read-out operation procedure is output from the memory means 7, and then, the read-out control means 4 is driven by the read-out operation procedure. The data side control means 9 enables the control data storing means 3 to enter a read-out state in response to a drive signal. That is the numerical 11 data memory means 11 is placed in an active state and the data side serial communication means 10 is placed in a wait state.

Next, a read-out address is fetched from the operation procedure memory means 7. The read-out address is set by the read-out control means 4. The content is set in the read-out control means 4. Thereafter, a communication initiates. The content set in the read-out control communication means 4 is received by the data side serial communication means 10.

Next, a read-out address latch instruction is output from the operation procedure memory means 7. This instruction is transferred to the data side control means 9 through the read-out control means 4 and the content of the data side serial communication means 10 is stored in the numerical data memory means 11 as its address. The numerical data memory means 11 outputs a control data signal corresponding to this address. The control data outputted thus is set in the data side serial communication means 10. Thereafter, a read-out instruction is fetched from the operation procedure memory means 7. The read-out instruction is transmitted to the control side serial communication means 5. In response to this transmission, the control side serial communication means 5 initiates a signal receiving operation. At this point, the data side serial communication means 10 automatically initiates a transmission operation. As a result, the control data signal is set in the control side serial communication means 5.

Next, the received control data instruction is fetched from the operation procedure memory means 7. In response to this received instruction, the control data signal is fetched from the control side serial communication means 5 and transferred to the communication result memory means 6. Thus, the communication result memory means 6 stores the control data for driving equipment employed in the air conditioner.

Next, a read-out termination instruction is fetched from the operation procedure memory means 7. The termination instruction is transmitted to the data side control means 9 through the read-out control means 4. As a result, the control data storing means 3 stops its operation and returns to a wait state.

Thereafter, the main control means 1 uses the control data stored in the communication result memory means 6 in order to control equipment employed in the air conditioner. The control data controls the operation of the drive means 2 for driving the equipment contained within the air conditioner.

That is, the fan motor 12, or one of the equipment is driven by the drive control means 8 and the drive means 2 in accordance with the control data stored by the control data memory means 3.

An embodiment of the present invention is described with reference to FIGS. 2 through 7 by making a comparison with the prior art.

In this embodiment, a microcomputer comprising a single chip having a serial communication means is adopted as the main control means 1 and a serial OTP (ultraviolet light erasing type programmable ROM in which data is written only once hereinafter referred to as a serial ROM); is adopted as the control data memory means 3. A transistor motor 12 and controlling means therefor are used as the drive means 2 and drive equipment. However, other types of microcomputers and serial ROMs may be utilized as the main control means 1 and the control data memory means 3. Serials ROMs of an electric writing erasing type, a non-volatile type memory or a mask type may be used instead of the ultraviolet erasing type serial ROM. The drawings and the descriptions of the portions not relevant to the gist of the present invention have been omitted for brevity, i.e., the air conditioner, refrigerant cycle, control means coupled to the air conditioner and the circuits thereof, power circuit, the contents of control modes and the like are not described herein. The internal construction of the microcomputer and its operation are not described either.

Figure 2:
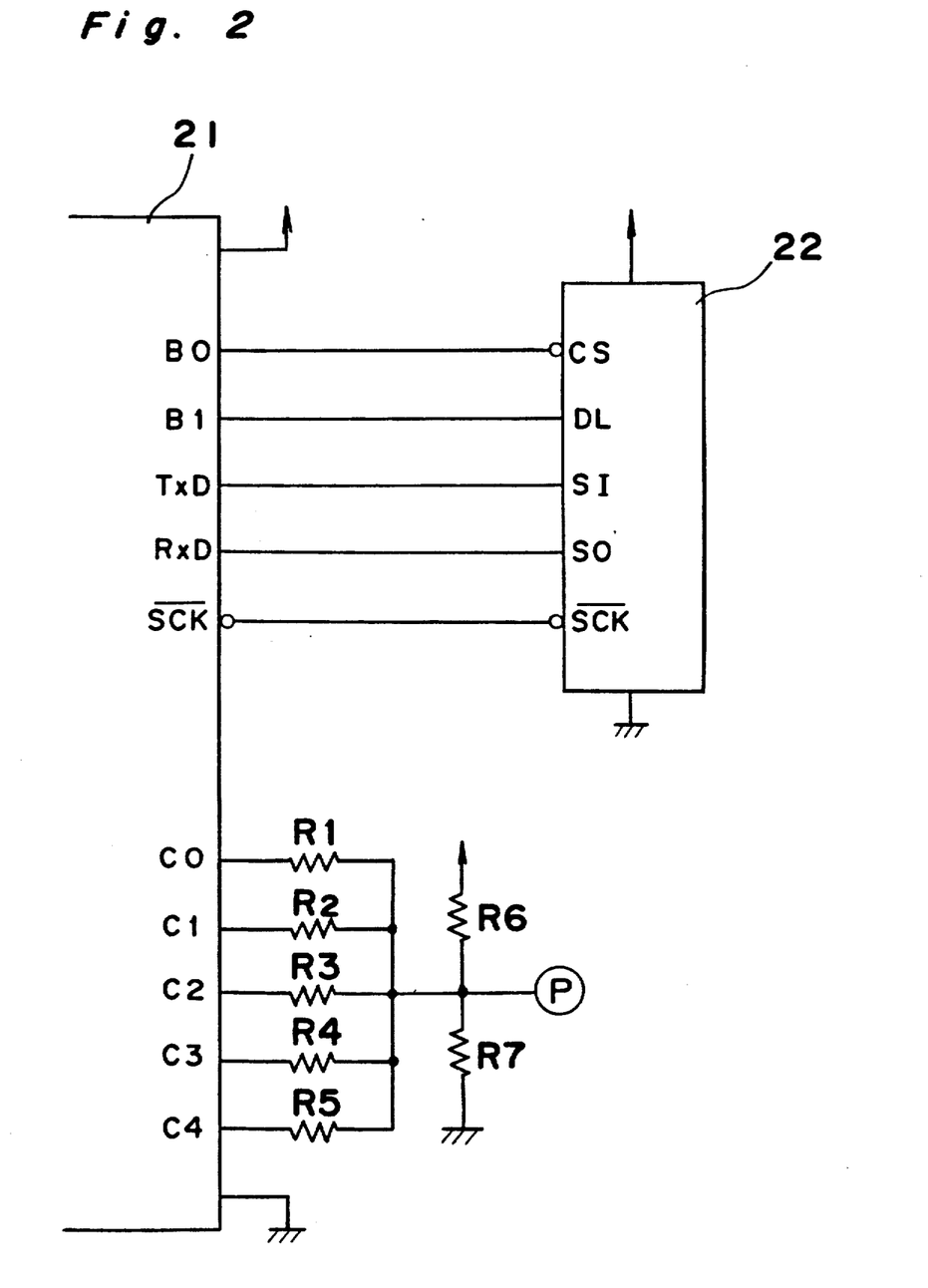
FIG. 2 is an electronic circuit diagram of an embodiment of the present invention.

FIG. 2 shows the electronic circuit of the portion at which a fan motor control voltage is generated.

The electronic circuit comprises a microcomputer 21 corresponding to the main control means 1, a serial ROM 22 (hereinafter referred to as serial ROM) corresponding to the control data memory means 3, and resistors R1 through R7. Referring to FIGS. 1 and 2, output terminals B0 and B1, and terminals $T_XD$ (output), $R_XD$ (input), SCK (output) correspond to the read-out control means 4 and the control side serial communication means 5, respectively. Output terminals C0 through C4 correspond to the drive control means 8. Input terminals CS and DL of the serial ROM 22 correspond to the data side control means 9 and terminals SI (input), SO (output), SCK (input) of the serial ROM 22 correspond to the data side serial communication means 10. The communication result memory means 6 and the operation procedure storing means 7 correspond to the RAM and ROM of the microcomputer 21. The numerical data memory means 11 correspond to the ROM of the serial ROM 22. The circuits thereof are not drawn. The terminals B0, B1, $T_XD$, $R_XD$, and SCK are connected to the terminals CS, DL, SI, SO, and SCK, respectively. As apparent from FIG. 2, the number of input/output terminals of the microcomputer 21 is only five (a general purpose PROM has more than 20 terminals.) The terminals C0 through C4 are connected to the resistors R1 through R5, respectively. The resistors R6 and R7 compose a D/A conversion circuit for converting word by word. The resistance values of these resistors are set to generate predetermined DC voltages. The point P in FIG. 2 corresponds to the point P in FIG. 8. As apparent from FIGS. 2 and 8, the number of resistors is three less than that of the prior art.

The detailed descriptions of the operations of the microcomputer 21 and the serial ROM 22 are made hereinafter with reference to FIGS. 3 and 4.

Figure 3:
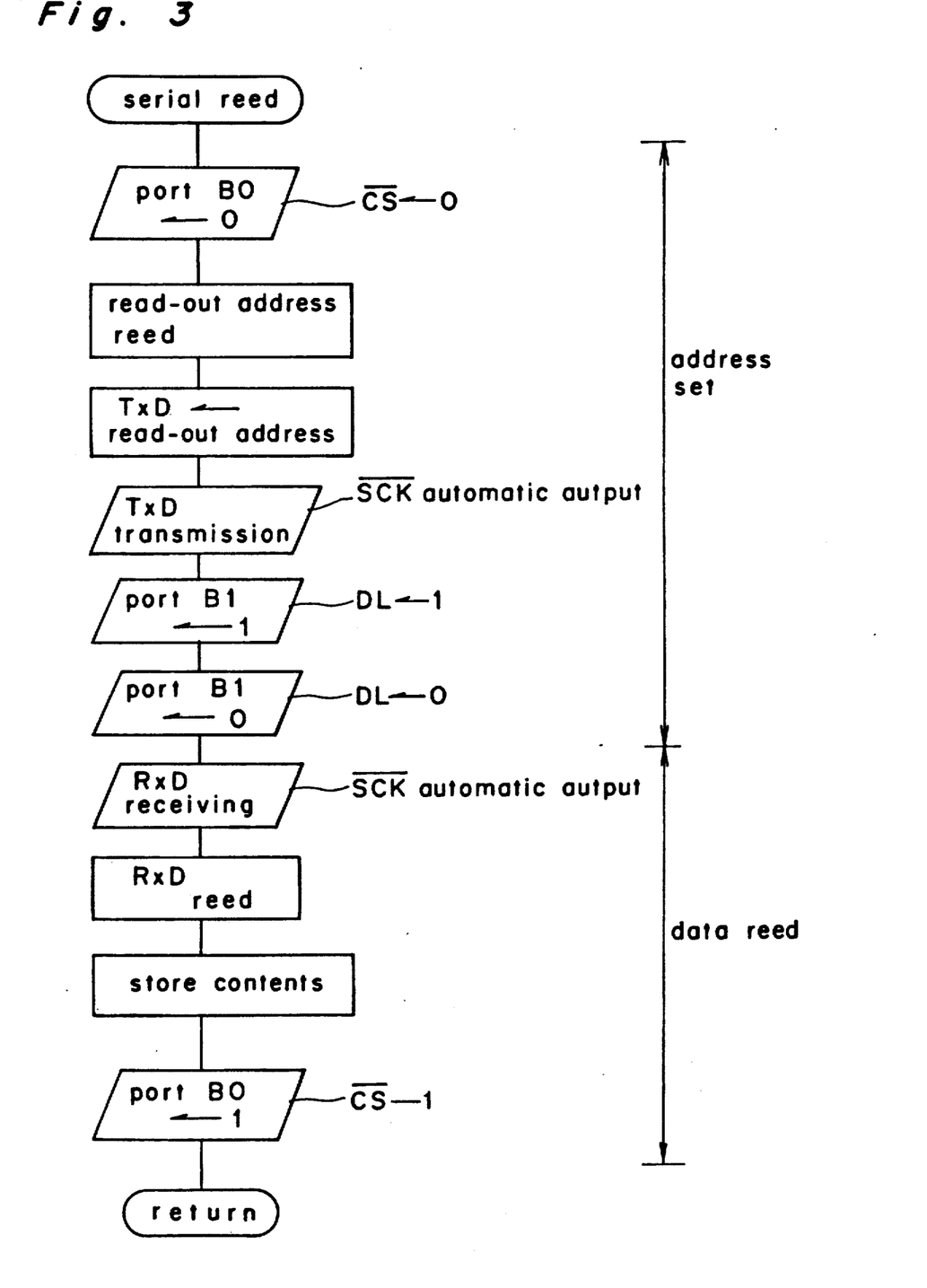
FIG. 3 is a flow chart showing the data read sequence of the serial ROM employed in the air conditioner control apparatus.
Figure 4:
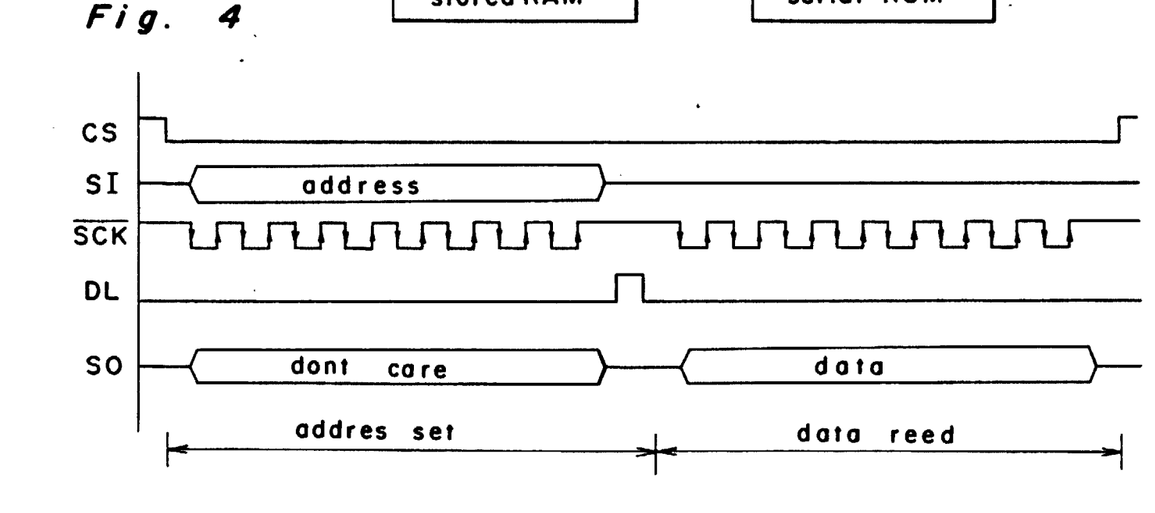
FIG. 4 is a timing chart showing the data read sequence of the serial ROM.

FIG. 3 shows the content (or the operation procedure memory means 7) of the ROM of the microcomputer 21, namely, the flow chart showing the operation for controlling the serial ROM 22. FIG. 4 shows the timing chart of the terminals of the serial ROM 22 in FIG. 2 based on the flow chart shown in FIG. 3.

First, the signal level of the B0 terminal, or the CS terminal (hereinafter described using the terminal names of the serial ROM 22) is set to 0, whereby the serial ROM 22 goes into an active state from the wait state, i.e., a serial communication can be performed.

Next, the read-out address is read from the ROM of the microcomputer 21, and the read-out data is set to the $T_XD$ terminal.

When a serial communication is initiated, an output is automatically supplied from the SCK terminal and the read-out address is transmitted to the serial ROM 22 (FIG. 2 shows that a signal is outputted by eight bits. Upon the fall of the level of the signal outputted from the SCK terminal, the output bit of the $T_XD$ terminal is altered. Upon the rise of the level of the signal outputted from the SCK terminal, the output bit of the $T_XD$ terminal is fed into the SI terminal. The output of the SO terminal applied at this time is not utilized in this embodiment. The detailed content and internal construction of the serial communication employed in the system of the present invention is omitted herein because they are employed in microcomputers and described in manuals. Serial communication systems other than the one described in this embodiment may be utilized. The provision of a serial communication LSI with devices in the periphery of the microcomputer and with the serial ROM does not depart from the gist of the present invention.

Next, the level of the DL terminal is set to 1, namely, high and then, 0, whereby the read-out address is latched in the serial ROM 22 and transmitted to the control data memory means 3. As a result, the control data is read out and set by the data side serial communication means 10. Thus, the data side serial communication means enters the wait state for transmitting the control data. The content of the control data is stored in the ROM of the serial ROM 22 before the control of the air conditioner starts. The detailed description of the method for determining and storing the content of the air conditioner control is omitted herein because it is not pertinent to the gist of the present invention.

The above is the procedure for setting the address.

Next, the data reading procedure is described hereinafter.

First, a signal receiving operation is initiated by setting the $R_xD$ terminal to a receiving state. Similar to a sending operation, a signal is automatically outputted from the SCK terminal. The control data is outputted from the S0 terminal and received by the $R_xD$ terminal, and then, transferred from the ROM 22 to the microcomputer 21 (in FIG. 4, a signal is outputted by eight bits. Upon the fall of the level of the signal outputted from the SCK terminal, the output bit of the S0 terminal is altered. Upon the rise of the level of the signal outputted from the SCK terminal, the output bit of the S0 terminal is fed into the $R_xD$ terminal.)

After the serial communication is completed, the content of the $R_xD$ terminal, namely, the control data is stored in the RAM of the microcomputer 21.

The level of the CS terminal is set to 1 and the serial ROM 22 is set to the wait state (initial state). Thus, the data reading procedure is completed.

Figure 5:
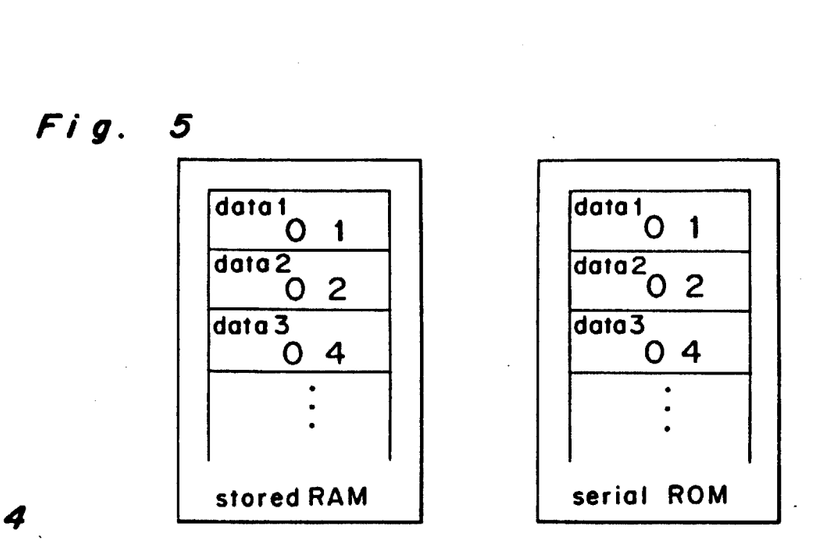
FIG. 5 is control data arrangement views of the serial ROM and the RAM of the microcomputer.

According to the embodiment, the control data is transferred from the serial ROM 22 to the microcomputer 21. All the necessary control data can be obtained by repeating the above-described storing procedure. Referring to FIG. 5, the control data is transferred from the ROM of the serial ROM 22 to the RAM (the communication result memory means 6) of the microcomputer 21.

Figure 6:
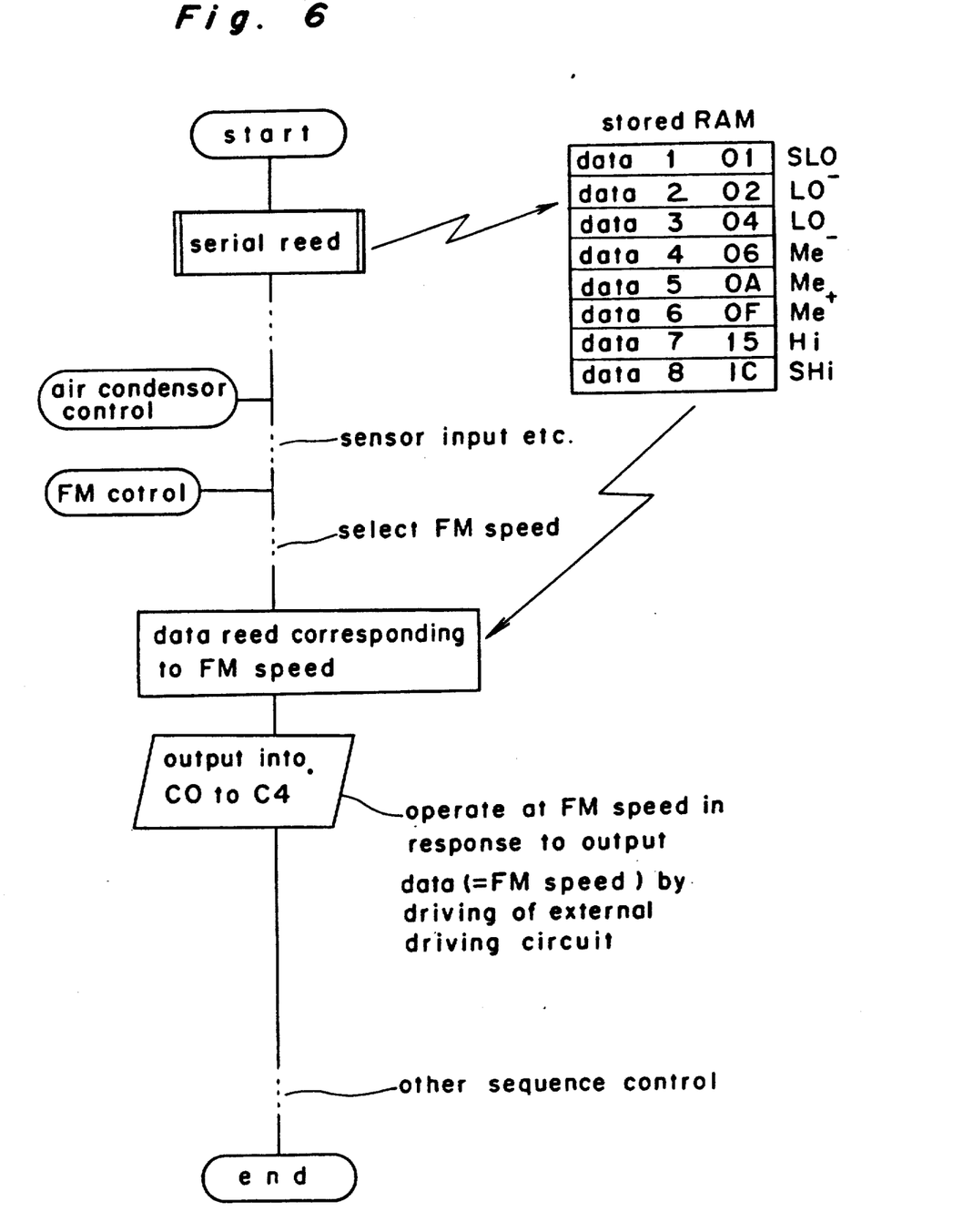
FIG. 6 is a flow chart showing an example of the sequence of controlling equipment of the microcomputer.

A fan motor control using eight groups of this control data is shown in FIG. 6.

FIG. 6 is a flow chart showing that during the fan motor control operation, the control data is outputted for the microcomputer 21.

First, the control data storing procedure shown in FIG. 3 is performed eight times so as to store the control data necessary for the RAM of the microcomputer 21. Thereafter, the stored control data is used in a processing routine for controlling the fan motor 12. That is, after the fan motor speed is selected by the processing routine, the control data corresponding to the selected fan motor speed is read out from the RAM of the microcomputer 21, and then, outputted to the C0~C4 terminals.

As a result, a DC voltage corresponding to the selected fan motor speed is generated at the point P by the D/A conversion circuit for converting data word by word. Thus, the fan motor 12 is driven.

Figure 7:
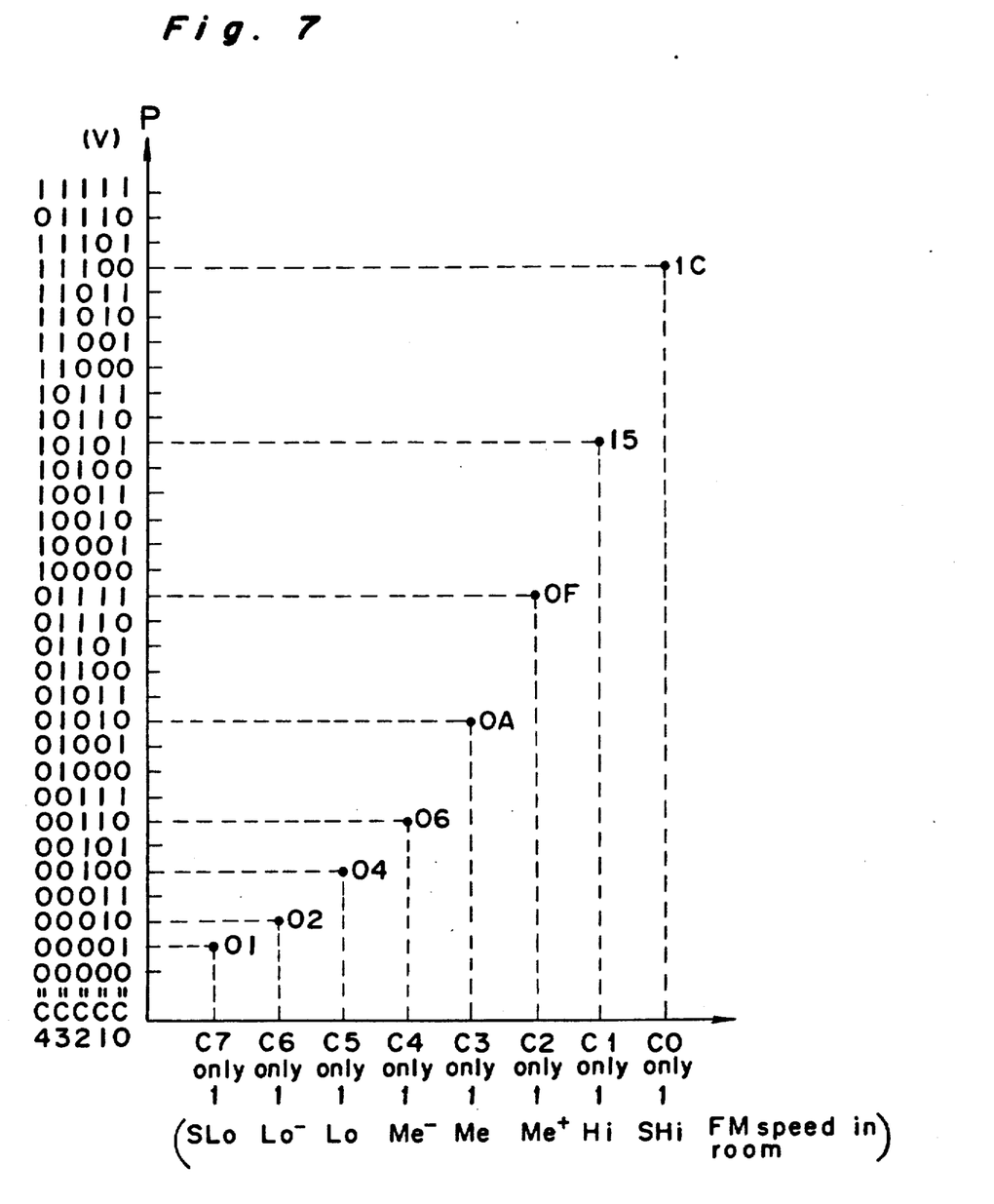
FIG. 7 is an illustration view showing the relationship between the outputs of the output terminals of the microcomputer and the speed of a fan motor.

FIG. 7 shows the relationship between the DC voltage at the point P and the fan motor speed. As shown in FIG. 7, for example, when the fan motor speed is Me, the DC voltage is 0AH (H indicates hexadecimal representation.) Likewise, the speeds SL0~SHi correspond to the DC voltages 01H~1CH, respectively.

That is, conventionally, a DC voltage is obtained by outputting the control data from one of the terminals C0 through C7 (for example, the speed Me corresponds to control data 08H), whereas according to this embodiment, a DC voltage is obtained by outputting the control data from the terminals C0 through C4 in combination. The fan motor 12 is driven by the DC voltage generated at the point P.

The drive control means 8 is operated in accordance with the control data stored in the serial ROM 22 so as to obtain a predetermined fan motor speed through the drive means 2. The formation of a table with regard to the control data simplifies the work in changing a desired fan motor speed. As described above, a selected control data is stored by the serial ROM 22. The increase of the number of the ports and the resistors shown in FIG. 2 increases the resolution for selecting the number of control data up to $2^n$, which standardizes the circuits of the non-power units composing the drive means 2 because similar to this embodiment, the maximum and minimum values of the DC voltage and the operation variation range of the drive means 2 are definite. Accordingly, the circuits can be hybridized, which though secondarily, leads to the reduction of the cost of the air conditioner control apparatus. The air movement capacity of the fan motor 12 caused by the cooling capacity difference of air conditioners may be changed by altering the capability of the power supply unit. The detailed description of the above-described techniques are omitted herein because they are well known in the art.

The above-noted embodiment is described using a transistor motor as an example; however, an air conditioner control apparatus of the present invention can be operated by controlling the phase of an induction motor or may be employed in equipment contained within an air conditioner, for example, a heater.

The control of the fan motor speed is described in this embodiment. However, the controls of the following controls are also possible by changing or selecting numerical data depending on the capacities or specifications of air conditioners; the control of the inverter waveform (control of rotation speed) of a motor for use in an inverter drive type compressor composing a refrigerant cycle or the protection control of the eddy current and defrosting of a compressor.

Furthermore, the control data of the serial ROM 22 can be also input to the communication result memory means 6 of the microcomputer 21 by the following methods; the method of the read-in of all control data simultaneously by the above-described serial communication so as to control the operation mode of the air conditioner by the microcomputer 21 (the main control means 1) and the method of the read-in of only data necessary for a control so as to control the operation mode of the air conditioner.

Of the above-described two methods, the former method is suitable for enabling a very fast control or a complex control, namely, processing of large amounts of data. The latter method is suitable for the microcomputer 21 whose storage capacity (the storage capacity of the communication result storing means 6 included in the main control means 1) is small.

Which of the two methods is selected depends on the conditions used in designing the microcomputer 21.

According to the present invention, the control data required to be changed because of the difference in the capacities of air conditioners to which the same control sequence is applicable can be accomplished by changing the control data stored in a serial ROM. Furthermore, the operation for changing the control data is very easy, which shortens the period of time required for constructing air conditioner control apparatus and allows the standardization of the circuit construction, hence making the construction economical. Furthermore, the number of parts of the air conditioner control apparatus are reduced, which leads to a simple construction. The control data to be used for the control of driving equipment of the air conditioner can be easily changed and modified by changing the control data stored in a serial ROM. Accordingly, the economical manufacture of various types of control apparatus is possible. Furthermore, a fine adjustment of the capacity of the same type of air conditioner control apparatus is possible by appropriately setting the time of storing the control data in the serial ROM. In addition, the improved construction of the air conditioner control apparatus of the present invention does not give an unfavorable influence on parts or devices contained within the apparatus necessary for the controls of the air conditioner including the control of a refrigerant cycle. The operation for changing the control data is easy, hence practically usable.

In addition, the following advantages are obtained. Since the control data is mounted in the periphery of the main control means and as such, the external storage capacity is easy to utilize. Therefore, the control data is capable of storing an abnormality occurrence point, which makes it possible to continuously control the fan motor. This provides users with a fine air conditioning control capability.

As apparent from the foregoing description, the present invention improves the versatility of the control of air conditioners. Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A data drive apparatus for controlling an air conditioner device, the air conditioner device having predetermined operating variables and operating according to a plurality of control modes, said data drive apparatus comprising:
    a main control means, having means for operatively coupling to the air conditioner device, for controlling the air conditioner device according to numerical data, and for receiving the numerical data by carrying out common operating instructions, the common operating instructions being operable for any of a plurality of air conditioning devices having different predetermined operating variables;
    a control data storing means, operatively coupled to said main control means, for storing the numerical data, the numerical data being specific to the predetermined operating variables of an air conditioner device coupled to said main control means;
    said main control means comprising:
        (a) an operation procedure storing means for storing the common operating instructions;
        (b) a read-out control means for accessing said control data storing means according to said common operating instructions;
        (c) a control side serial communication means for effecting data communication with said control data storing means so as to receive the numerical data from said control data storing means;
        (d) a communication result storing means for storing the numerical data received during said data communication; and
        (e) means for operating the air conditioner device in at least one of the plurality of control modes according to the numerical data stored in said communication result storing means;
    said control data storing means comprising:
        (a) a numerical data storing means for storing the numerical data;
        (b) a data side control means for accessing the numerical data storing means in response to a control signal from said read-out control means; and,
        (c) a data side serial communication means for effecting data communication with said control side serial communication means of said main control means so as to transmit to said main control means the numerical data;
    wherein said main control means is provided separately from said control data storing means and said main control means is connected to said control data storing means via a signal line; and,
    wherein said main control means is operatively connectable to any of a plurality of air conditioning devices having different operating variables and wherein said control data storing means is specific to an air conditioning device of predetermined operating variable.

2. A data drive apparatus as claimed in claim 1, wherein said data side control means is operated by said read-out control means to access numerical data stored in said numerical data storing means according to one of said plurality of control modes, the numerical data being stored in said communication result storing means of said main control means after passing through said serial communication means.

3. A data drive apparatus as claimed in claim 2, wherein said main control means is a self-contained single chip microcomputer, said procedure storing means being a ROM memory of said microcomputer, and said communication result storing means being a RAM memory of said microcomputer.

4. A data drive apparatus as claimed in claim 3, wherein said control data storing means is a self-contained serial programmable ROM.

5. A data drive apparatus as claimed in claim 2, wherein said control data storing means is a self-contained serial programmable ROM.

6. A data drive apparatus as claimed in claim 1, wherein said main control means is a self-contained single chip microcomputer, said procedure storing means being a ROM memory of said microcomputer, and said communication result storing means being a RAM memory of said microcomputer.

7. A data drive apparatus as claimed in claim 6, wherein said control data storing means is a self-contained serial programmable ROM.

8. A data drive apparatus as claimed in claim 1, wherein said control data storing means is a self-contained serial programmable ROM.

9. A data drive apparatus for controlling an air conditioner device, the air conditioner device having predetermined operating variables and operating according to a plurality of control mode, said data drive apparatus comprising:
- a main control means for controlling the air conditioner device according to numerical data, and for receiving the numerical data by carrying out common operating instructions, the common operating instructions being operable for any of a plurality of air conditioning devices having different predetermined operating variables;
- a drive means, operatively coupled between said main control means and the air conditioner device, for driving the air conditioner according to said main control means;
- a control data storing means, operatively coupled to said main control means, for storing the numerical data used for controlling said drive means, the numerical data being specific to the predetermined operating variables of an air conditioner device coupled to said main control means;

said main control means comprising:
- (a) an operation procedure storing means for storing the common operating instructions;
- (b) a read-out control means for accessing said control data storing means according to said common operating instructions;
- (c) a control side serial communication means for effecting data communication with said control data storing means so as to receive the numerical data from said control data storing means;
- (d) a communication result storing means for storing the numerical data received during said data communication;
- (e) a drive control means for controlling an operation of said drive means; and
- (f) means for operating the drive control means in at least one of the plurality of control modes according to the numerical data stored in said communication result storing means;

said control data storing means comprising:
- (a) a numerical data storing means for storing the numerical data;
- (b) a data side control means for accessing said numerical data storing means in response to a control signal from said read-out control means; and
- (c) a data side serial communication means for effecting data communication with said control side serial communication means of said main control means so as to transmit to said main control means the numerical data;

wherein said main control means is provided separately from said control data storing means and said main control means is connected to said control data storing means via a signal line;

wherein said main control means is operatively connectable to any of a plurality of air conditioning devices having different operating variables and wherein said control data storing means is specific to an air conditioning device of predetermined operating variable.

10. A data drive apparatus as claimed in claim 9, wherein said data side control means is operated by said read-out control means to access numerical data stored in said numerical data storing means according to one of said plurality of control modes, the numerical data being stored in said communication result storing means of said main control means after passing through said serial communication means.

11. A data drive apparatus as claimed in claim 10, wherein said main control means is a self-contained microcomputer, said operating procedure storing means being a first memory of said microcomputer, and said communication result storing means being a second memory of said microcomputer.

12. A data drive apparatus as claimed in claim 11, wherein said control data storing means is a self-contained serial programmable ROM.

13. A data drive apparatus as claimed in claim 10, wherein said control data storing means is a self-contained serial programmable ROM.

14. A data drive apparatus as claimed in claim 9, wherein said main control means is a self-contained single chip microcomputer, said operating procedure storing means being a first memory of said microcomputer, and said communication result storing means being a second memory of said microcomputer.

15. A data drive apparatus as claimed in claim 14, wherein said control data storing means is a self-contained serial programmable ROM.

16. A data drive apparatus as claimed in claim 9, wherein said control data storing means is a self-contained serial programmable ROM.

17. A data drive apparatus for controlling an air conditioner device, the air conditioner device having predetermined operating variables and operating according to a plurality of control mode, said data drive apparatus comprising:
- a main control means for controlling the air conditioner device according to numerical data, and for receiving the numerical data by carrying out common operating instructions, the common operating instructions being operable for any of a plurality of air conditioning devices having different predetermined operating variables;
- a drive means, operatively coupled between said main control means and the air control device, for driving the air conditioner according to said main control means;
- a control data storing means, operatively coupled to said main control means, for storing the numerical data used for controlling said drive means, the numerical data being specific to the predetermined operating variables of an air conditioner device coupled to said drive means;
- wherein said main control means, said drive means, and said control data storing means are physically separate and independent circuits;

said main control means comprising:
- (a) an operation procedure storing means for storing the common operating instructions;
- (b) a read-out control means for accessing said control data storing means according to said common operating instructions;
- (c) a control side serial communication means for effecting data communication with said control data storing means so as to receive the numerical data from said control data storing means;
- (d) a communication result storing means for storing the numerical data received during said data communication;
- (e) a drive control means for controlling an operation of said drive means;

(f) means for operating the drive control means in at least one of the plurality of control modes according to the numerical data stored in said communication result storing means;

said control data storing means:
  (a) a numerical data storing means for storing the numerical data;
  (b) a data side control means for accessing said numerical data storing means in response to a control signal from said read-out control means; and
  (c) a data side serial communication means for effecting data communication with said control side serial communication means of said main control means so as to transmit to said main control means the numerical data;

said numerical data storing means being a serial ROM:

said read-out control means being connected to said data side control means via a signal line and said control side serial communication means being connected to said data side control means via a signal line;

said data side control means being operated by a read-out command of said read-out control means;

wherein all numerical data stored in said numerical data storing means is output by the operation of said data side control means according to the read-out command;

the thus outputted numerical data being stored in said communication result storing means of said main control means after passing through said data side serial communication means;

said drive means being operated by said main control means according to the numerical data stored in said communication result storing means;

wherein said main control means is operatively connectable to any of a plurality of air conditioning devices having different operating variables and wherein said control data storing means is specific to an air conditioning device of predetermined operating variables.

* * * * *